July 18, 1939.  G. A. CARLSON  2,166,461
WORK SUPPORTING TABLE
Filed June 30, 1938   3 Sheets-Sheet 1

INVENTOR.
Gustave A. Carlson
BY
ATTORNEY.

July 18, 1939.   G. A. CARLSON   2,166,461
WORK SUPPORTING TABLE
Filed June 30, 1938   3 Sheets-Sheet 2
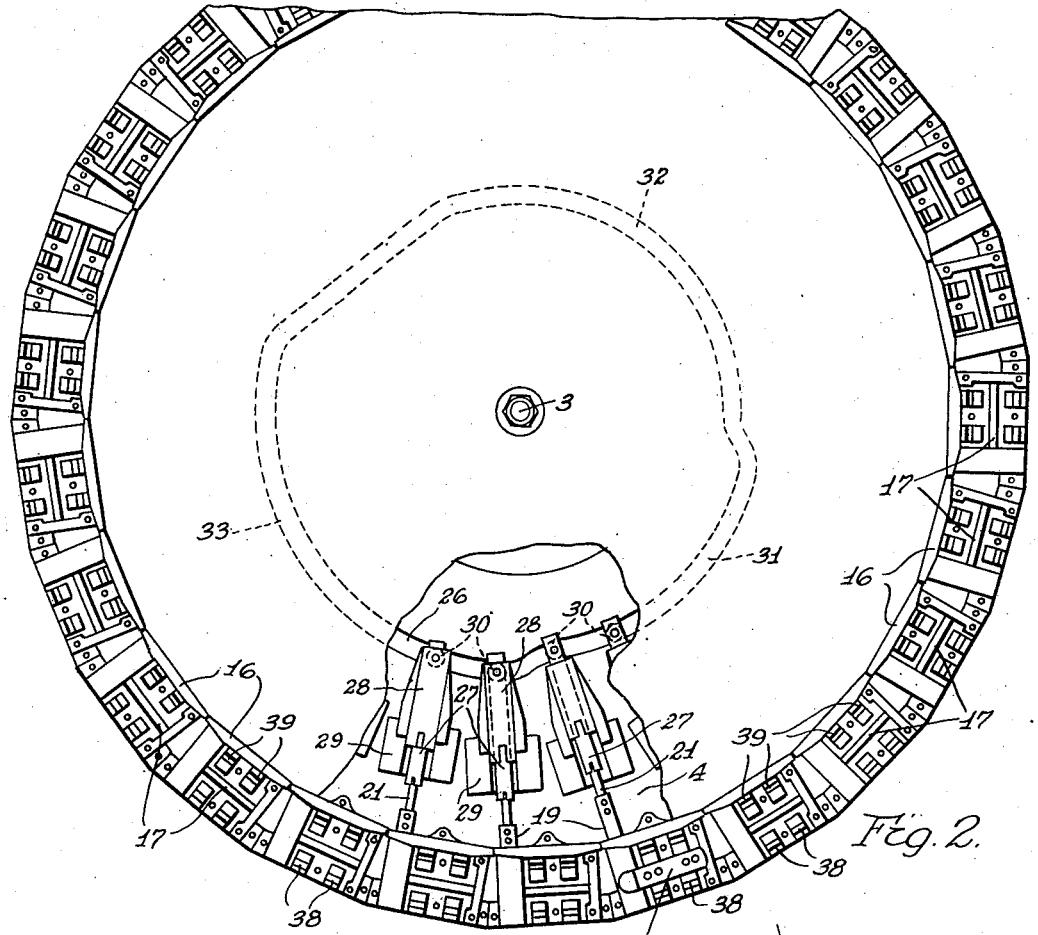
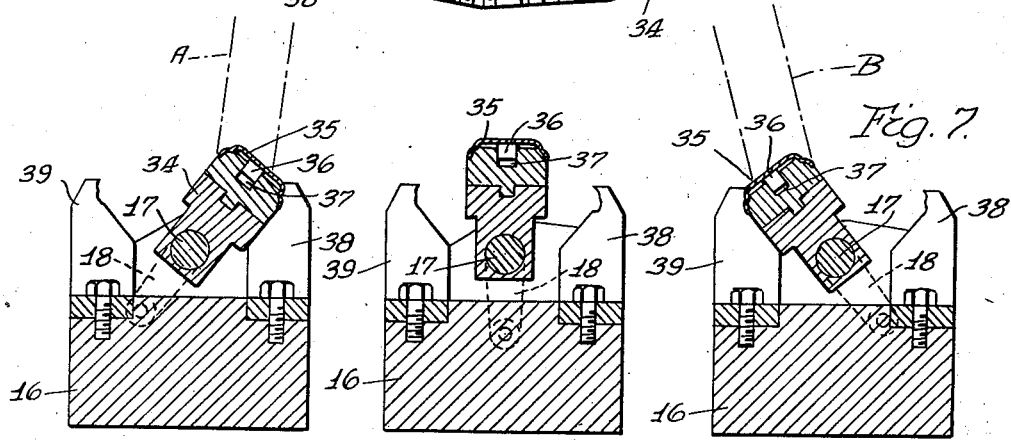
Gustave A. Carlson
INVENTOR.
BY J. Windsor Davis
ATTORNEY.

July 18, 1939.  G. A. CARLSON  2,166,461
WORK SUPPORTING TABLE
Filed June 30, 1938  3 Sheets-Sheet 3
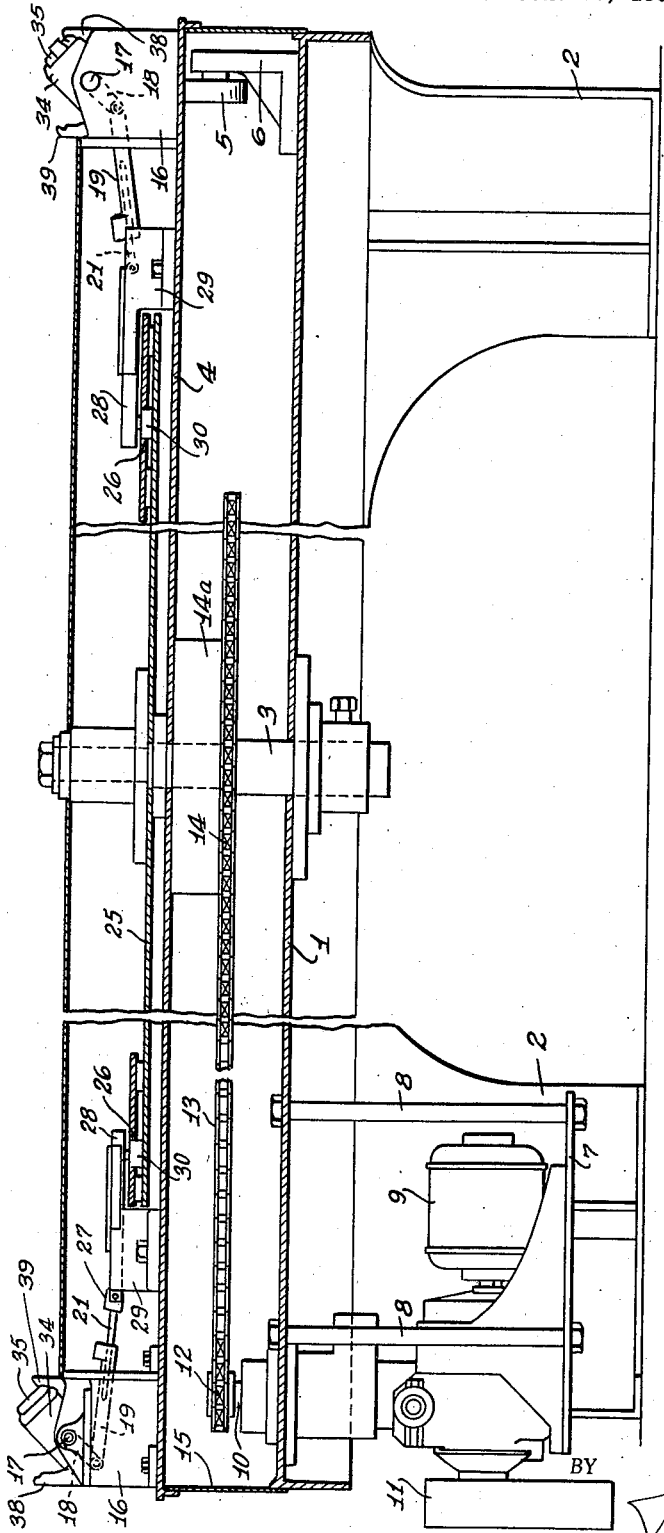
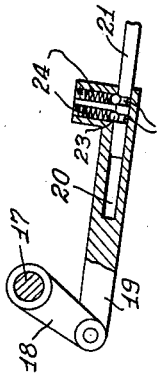
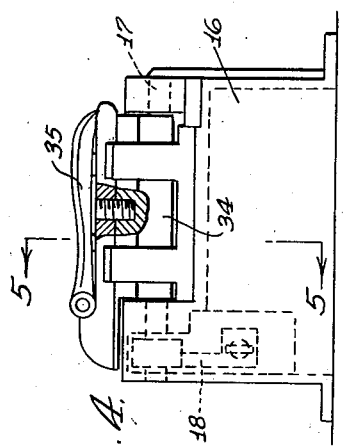
INVENTOR.
Gustave A. Carlson
BY
ATTORNEY.

Patented July 18, 1939

2,166,461

UNITED STATES PATENT OFFICE 2,166,461

WORK SUPPORTING TABLE

Gustave A. Carlson, Detroit, Mich.

Application June 30, 1938, Serial No. 216,697

13 Claims. (Cl. 51—237)

This invention relates to polishing and buffing machines and has for its primary object to provide a machine embodying a plurality of work holding fixtures carried by a movable member which presents the work carried by said fixtures successively to a series of polishing or buffing wheels.

Another object is to provide a machine of the character above mentioned wherein the movable member carries the work supporting fixtures in a circular path, thereby enabling loading and unloading of the fixtures at a single station.

Another object is to provide a machine of the character above mentioned having tiltable work supports and means for tilting the same automatically incident to the travel of the movable member. Tilting of the work supports adapts the machine for handling work pieces of irregular cross section in that it successively presents the several angularly disposed surfaces of the work to an uppermost position, wherein the polishing or buffing wheels may contact therewith.

Another object is to provide a machine of the character above defined including means for clamping work pieces on the work supports to prevent accidental displacement thereof, said clamping means being automatically rendered operative and inoperative incident to the travel of the movable member.

Another object is to provide a machine embodying tiltable work supports and automatic means for tilting the same together with relatively stationary elements against which said work supports come to rest before the performance of work thereon. As the work supports are tilted, different portions of their surfaces are exposed uppermost, and the stationary elements engage other portions of the work pieces, leaving substantial portions unobstructed for contact with the polishing or buffing wheels, the stationary elements providing solid backing and relieving the tilting mechanism of undue strains.

Another object is to provide apparatus of the character described comprising a rotary table with work supports mounted thereon for tilting movement about an axis substantially perpendicular to a radial line of the table, and reciprocable actuating means disposed substantially radially of the table, extending inwardly of the table. The actuating members are reciprocated by cam means, acting on the inner ends thereof, and during reciprocation thereof are subject only to forces acting in compression or tension. The mechanism is thus practically free from bending stresses and may be readily lubricated.

Another object is to provide a machine of the character above mentioned including a safety mechanism in the actuating means for tilting the work supports, whereby the fixtures, work supports, clamping means and actuating means are not subject to damage as a result of stoppage of movement thereof due to the presence of an obstruction in any part of the machine.

Another object is to provide a machine embodying a plurality of polishing and buffing wheels, each individually operated, and each individually adjustable.

In the accompanying drawings

Fig. 2 is a plan view, with the cover plate partly removed, and with some of the work supporting fixtures omitted;

Fig. 3 is a vertical section of the machine;

Fig. 4 is an elevation of a fixture;

Figs. 5, 6 and 7 are sections, all taken on the plane of the line 5—5 of Fig. 4, and each showing a work holder in a different position, and Fig. 8 is a fragmental section of a detail.

Figure 1:
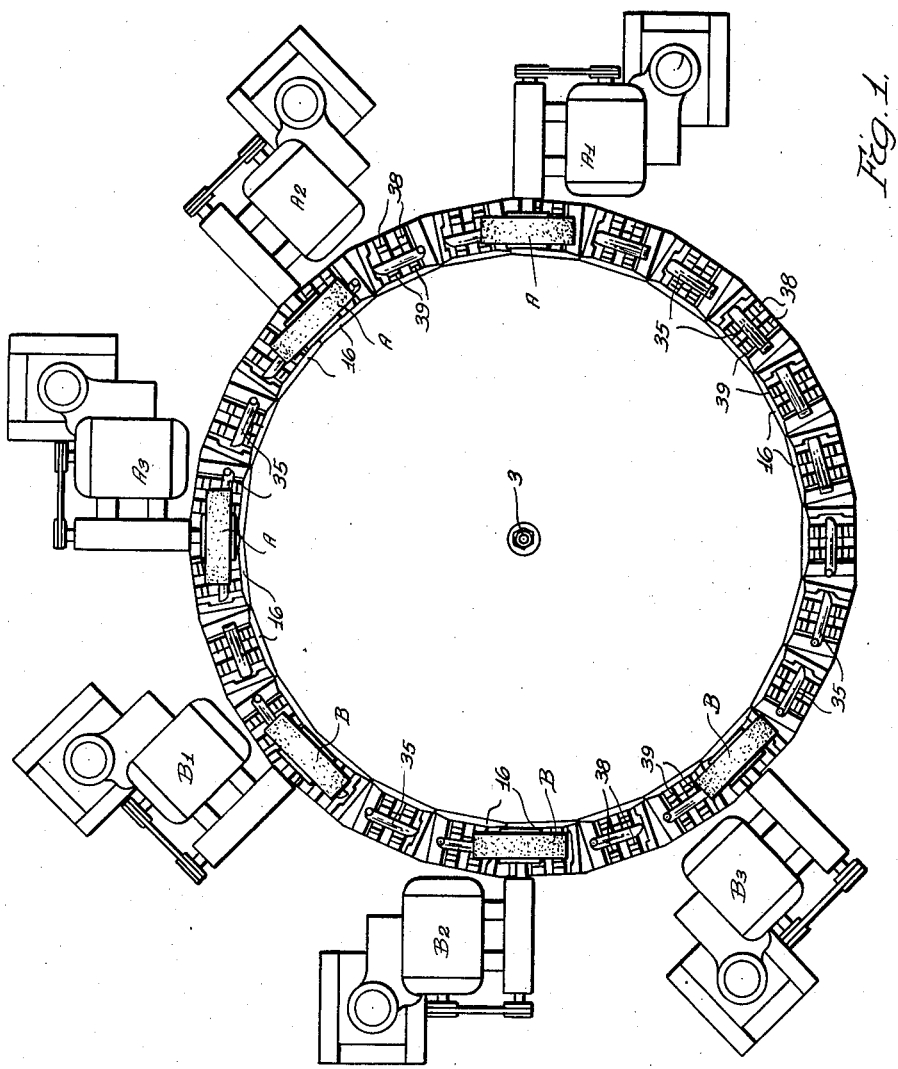
Fig. 1 is a plan view of the apparatus.

The present machine comprises a horizontal table 1 supported stationary by a base 2, and supported centrally of the table 1, with its axis vertical, is a stationary shaft 3. A rotatable table 4 is supported by a plurality of rollers, one of which is shown at 5 in Fig. 3 with its supporting bracket 6 mounted on the stationary table 1, for rotation about the shaft 3. A motor support 7 is suspended beneath the table 1 by rods 8 and mounted thereon is a motor 9 which operates a vertical shaft 10 through a suitable speed reducing means generally designated 11. The vertical shaft 10 has a sprocket 12 thereon connected by a chain 13 to a sprocket 14 which is loosely mounted on the vertical shaft 3, and which is connected to the rotatable table 4 by a collar 14a.

It is apparent, from the foregoing, that operation of the motor 9 causes rotation of the table 4 about a vertical axis. The motor 9 and the speed reducing means in being suspended beneath the table 1 is protected from damage and offers no obstruction to the operator of the machine. The mechanism which is disposed between the stationary table 1 and the rotatable table 4 is protected by a cylindrical housing 15 which depends from the rotatable table 4.

Removably mounted upon the rotatable table 4 is a series of work supporting fixtures, the fixtures being removable for the purpose of enabling changing the same to accommodate work pieces of different shape. Regardless of any particular work piece shape, however, the principle of operation of the fixtures remains unchanged, and it is to be understood that the particular shapes here shown are by way of example only, and that numerous other shapes are contemplated.

The fixtures on any given machine are identical, each comprising a base portion 16 attached by bolts or the like to the top surface of the rotatable table 4, adjacent the periphery thereof. In each base 16 is rotatably journalled a shaft 17 having a lever 18 secured to one end thereof. Pivotally connected to the free end of the lever 18 is a rod 19 having a bore 20 (see Fig. 8) slidably receiving the end of a link 21, the latter having two circumferential grooves 22 into which balls 23 are pressed by springs 24. The balls 23 normally hold the link 21 against lengthwise sliding movement in the bore 20, except when pressure tending to cause such movement exceeds a predetermined amount, in which case the balls 23 yield and permit such movement.

The link 21, as is hereinafter described, is cam actuated to oscillate the lever 18 and shaft 17, and the purpose of the yieldable connection above described is to prevent damage to the cam or the fixture in the event an obstruction is present.

Mounted upon the stationary central shaft 3 is a plate 25 upon which is mounted a shrouded cam 26, shaped as may be seen in Fig. 2. Each link 21 is articulately connected at 27 to a slidable element 28 in a guide 29 carried by the rotatable table 4, and each slidable element has a depending roller 30 disposed in the shrouded cam 26. As the table 4 is rotated, the roller 30 on each slidable element 28 moves through the shrouded cam 26, and the latter has three distinct portions designated 31, 32 and 33. As a roller 30 passes through the shrouded cam portion 31 an imaginary radial line in the shaft 17, to which its slidable member 28 is connected by the linkage above described, will be vertical. As the same roller passes through the cam portion 32 the same radial line will be tilted to the right of the vertical, and as it passes through the cam portion 33 the same radial line will tilt to the left of the vertical.

Carried by each shaft 17 and movable therewith is a work support 34 which is shaped, in the present instance, to receive the leaf of a hinge. The hinge leaf 35, shown upon the work support in Figs. 5, 6 and 7, has one or more studs 36 thereon disposed in bores 37 in the work support. The loading position of the work support is shown in Fig. 6 wherein it is illustrated that the hinge leaf 35 rests loosely upon the work support. The hinge leaf 35 has a cross sectional shape such that it would be most difficult or impossible for a polishing or buffing wheel to contact the entire width thereof. However, as the table 4 is rotated, and the shrouded cam causes the shafts 17 to oscillate through means of the mechanism above described, the work supports are tilted from the vertical position shown in Fig. 6 to positions either to the right or left of the vertical, as shown in Figs. 5 and 7, respectively. When tilted as shown in Fig. 5 a polishing or buffing machine may contact at least half the width of the hinge leaf 35, and when tilted as shown in Fig. 7 another wheel may contact the other half.

With the work support tiltable as above described there is, of course, possibility of the work piece becoming accidentally dislodged. To prevent this, stationary elements 38 and 39 are mounted to the right and left, respectively, of each work support, as a work support is viewed in Figs. 5, 6 and 7. The stationary elements 38 and 39 have portions shaped to conform to the edge contour of the work piece 35, and as the work support 34 tilts to the right, as shown in Fig. 5, the right hand edge of the hinge leaf is clamped between the stationary elements 39 and the work support 34, while the left hand edge of the hinge leaf and a major portion of its top surface are exposed to the polishing or buffing wheel A. The reverse takes place when the work support is tilted to the left as shown in Fig. 7, or in other words, the left hand edge of the hinge leaf is clamped while the right hand edge and a major portion of the top surface are exposed to the polishing or buffing wheel B.

As may be seen upon reference to Fig. 1, a plurality of polishing or buffing wheels are employed to contact the work pieces as they are carried in a circular path by rotation of the table 4. Said polishing or buffing wheels are carried by separate units, individually powered and individually adjustable, and are arranged in groups designated A1, A2 and A3 for performing the first polishing stage shown in Fig. 5, and B1, B2 and B3 for performing the second polishing stage shown in Fig. 7.

The terms polishing and buffing have been used only for convenience in describing the preferred embodiment of the invention, and are intended to embrace all analogous operations wherein the present machine might have utility.

What is claimed is:

1. The combination of a plurality of work holding fixtures arranged in a circle about an axis of rotation, means rotating said fixtures about said axis, means tilting said fixtures through an arc contained by a plane substantially radial of said axis, and stops for limiting tilting movement of said supports, said stops having means for clamping work pieces on tilted fixtures.

2. The combination of a work table mounted for rotation about an axis within the contour thereof, a plurality of fixtures carried by said table at uniform distances from said axis, means causing said fixtures to tilt through an arc normal to their direction of rotation, and stops for limiting tilting movement of said supports, said stops having means for clamping work pieces on tilted fixtures.

3. The combination of a work table mounted for rotation about an axis within the contour thereof, a plurality of fixtures carried by said table at uniform distances from said axis, means causing the top of said fixtures to oscillate toward and away from said axis, and positive stops adapted to be engaged by tilted fixtures, said stops having clamping portions adapted to clamp work pieces on supports contacting therewith.

4. The combination of a plurality of work holding fixtures arranged in a circle about an axis of rotation, means rotating said fixtures about said axis, stop rests on each side of each of said fixtures, and means operated by rotation of said fixtures for tilting said fixtures alternately against said rests whereby said means are relieved of extrinsic pressures to which the work is subjected.

5. In apparatus of the character described, a work support, means for moving said work support in a definite path between a loading station and an unloading station, work performing members positioned adjacent the path of said work support and adapted to contact a work piece carried by said support, automatic means tilting said work support incident to its travel to present different surfaces of the work piece to said work performing members, and means rendered operative by tilting of the support for engaging a work piece on a tilted support to clamp said work piece thereon.

6. In apparatus of the character described, a rotatable member, a plurality of work supports carried by said rotatable member, a plurality of work performing members arranged about the axis of the rotatable member and adjacent the path of movement of said work supports, means for rotating said rotatable member to successively present work pieces carried by said supports to said work performing members, means for tilting said work supports automatically incident to movement of the rotatable member whereby to expose different surfaces of the work piece uppermost, and positive rests engaged by the lowermost edges of tilted work supports.

7. In apparatus of the character described, a rotatable member, a plurality of work supports carried by said rotatable member, a plurality of work performing members arranged about the axis of the rotatable member and adjacent the path of movement of said work supports, means for rotating said rotatable member to successively present work pieces carried by said supports to said work performing members, work piece clamping members adjacent each support, and means rendered operative incident to movement of the rotatable member for moving work pieces on the supports into engagement with said clamping members for clamping work pieces upon said supports.

8. In apparatus of the character described, a rotatable member, a plurality of work supports carried by said rotatable member, a plurality of work performing members arranged about the axis of the rotatable member and adjacent the path of movement of said work supports, means for rotating said rotatable member to successively present work pieces carried by said supports to said work performing members, means for tilting said work supports automatically incident to movement of the rotatable member whereby to expose different surfaces of the work piece uppermost, and means engaged by the lowermost surfaces only of the work pieces on tilted supports for clamping the work pieces thereon.

9. In apparatus of the character described, a stationary vertical shaft, a table rotatable on said shaft, means for rotating said table, a plurality of tiltable work supports carried by said table, means on said table for tilting said work supports, a cam fixed to said shaft and engaged by said means whereby said means is actuated by rotation of said table, stationary elements adjacent said work supports adapted to engage and clamp work pieces thereon when said supports are tilted, and a plurality of work performing members arranged about said table and adapted to contact work carried by said supports.

10. In apparatus of the character described, in sub-combination, a stationary vertical support, a table rotatable with respect to said vertical support, means for rotating said table, a plurality of tiltable work supports carried by said table, means on said table for tilting said work supports, a cam on said vertical support for actuating said tilting means incident to rotation of the table, and means for rendering the connections between the tilting means and the work supports inoperative in the presence of an excessive force.

11. In apparatus of the character described in sub-combination, a rotatable table, means for rotating said table, a plurality of work receiving fixtures mounted on said table and moved in a circular orbit thereby, each fixture having a work support, a reciprocating member, connecting means between the reciprocating member and said work support whereby reciprocation of said member oscillates said work support, said connecting means including means for disconnecting the work support from the reciprocating member in the presence of a force in excess of a predetermined amount, a stationary cam and means on said reciprocating member engaging said cam whereby said cam reciprocates said member incident to rotation of said table.

12. In apparatus of the character described, in sub-combination, a movable member, a plurality of fixtures on said movable member each comprising a work support for work pieces, means oscillating said work support incident to movement of said movable member, and rigid members disposed at each side of said work support against which said work support alternately comes to rest at the end of each oscillation, said rigid members relieving said oscillating means of forces due to the performance of work on said pieces.

13. In apparatus of the character described, in sub-combination, a movable member, a plurality of fixtures on said movable member each comprising a work support for work pieces, means oscillating said work support incident to movement of said movable member, and rigid members disposed at each side of said work support against which said work support alternately comes to rest at the end of each oscillation, said rigid members relieving said oscillating means of forces due to the performance of work on said pieces, said rigid members having portions thereon adapted to engage and clamp said work piece on said support, and work performing means operative on said pieces only when said work supports are in contact with said rigid members.

GUSTAVE A. CARLSON.